United States Patent
Gradert

(10) Patent No.: US 9,604,401 B2
(45) Date of Patent: Mar. 28, 2017

(54) TOOL FOR PRODUCING A LAYER WITH MICRO STRUCTURED OUTER SURFACE ON A SUBSTRATE SURFACE

(71) Applicant: Airbus Operations GmbH, Hamburg (DE)

(72) Inventor: Isabell Gradert, Bremen (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 96 days.

(21) Appl. No.: 14/296,542

(22) Filed: Jun. 5, 2014

(65) Prior Publication Data

US 2014/0283738 A1 Sep. 25, 2014

Related U.S. Application Data

(63) Continuation of application No. PCT/EP2012/074617, filed on Dec. 6, 2012.

(30) Foreign Application Priority Data

Dec. 7, 2011 (DE) .................. 10 2011 120 498

(51) Int. Cl.
*B29C 59/02* (2006.01)
*B05C 1/14* (2006.01)
(Continued)

(52) U.S. Cl.
CPC .......... *B29C 59/026* (2013.01); *B05C 1/027* (2013.01); *B05C 1/14* (2013.01); *B05D 1/40* (2013.01);
(Continued)

(58) Field of Classification Search
CPC ......... B05C 1/027; B05C 1/14; B29C 59/046; B29C 35/0888; B29C 2059/023;
(Continued)

(56) References Cited

U.S. PATENT DOCUMENTS

| 6,162,489 A | 12/2000 | Buecher et al. |
| 7,736,570 B2 | 6/2010 | Stenzel et al. |
| 2004/0101619 A1* | 5/2004 | Camorani ............ B05B 7/1495 427/180 |

FOREIGN PATENT DOCUMENTS

| DE | 102006004644 B4 | 12/2007 |
| DE | 10118830 B4 | 6/2009 |
| WO | 03068531 A2 | 8/2003 |

OTHER PUBLICATIONS

International Searcing Authority, International Search Report for PCT Application No. PCT/EP2012074617, mailed Apr. 5, 2013.
(Continued)

*Primary Examiner* — Laura Edwards
(74) *Attorney, Agent, or Firm* — Lorenz & Kopf, LLP

(57) ABSTRACT

A tool for producing a layer with a micro structured outer surface on a substrate surface is provided. The tool includes an elastic matrix web with a negative of the micro structure to be produced, an elastic pressure roller that is movable over a surface, and at least one guiding element for guiding the elastic matrix web relative to the pressure roller. The pressure roller and the matrix web are arranged in such a manner that when the pressure roller is moved over the substrate surface, the negative on the matrix web faces the substrate surface. In this manner particularly good directional stability and guiding precision of the matrix web can be achieved.

16 Claims, 2 Drawing Sheets

Related U.S. Application Data

(60) Provisional application No. 61/568,016, filed on Dec. 7, 2011.

(51) Int. Cl.
  *B05C 1/02* (2006.01)
  *B29C 59/04* (2006.01)
  *B05D 3/06* (2006.01)
  *B05D 1/42* (2006.01)
  *B05D 1/40* (2006.01)
  *B29C 35/08* (2006.01)
  *B05D 3/12* (2006.01)

(52) U.S. Cl.
  CPC .................. *B05D 1/42* (2013.01); *B05D 3/06* (2013.01); *B29C 59/046* (2013.01); *B05D 3/067* (2013.01); *B05D 3/12* (2013.01); *B29C 35/0888* (2013.01); *B29C 2059/023* (2013.01)

(58) Field of Classification Search
  CPC .......... B29C 2035/0827; B29C 59/026; B05D 3/067; B05D 3/12; B05D 3/06; B05D 1/42; B05D 1/40
  USPC .................. 118/257; 425/371, 373, 374, 385
  See application file for complete search history.

(56) References Cited

OTHER PUBLICATIONS

German Patent and Trade Mark Office, German Office Action for German Patent Application No. 102011120498.2, mailed Jul. 16, 2012.
Amazon.De, Retrieved from Internet: <URL: www.amazon.de/Herma-1013-Klebespender-Transfer-haftend/dp/B0007OEBJA>.
European Patent Office, European Office Action for European Patent Application No. 12 809 146.9, mailed Apr. 16, 2015.

* cited by examiner

C - C:

TOOL FOR PRODUCING A LAYER WITH MICRO STRUCTURED OUTER SURFACE ON A SUBSTRATE SURFACE

CROSS-REFERENCE TO RELATED APPLICATIONS

This is a continuation of international Application No. PCT/EP2012/074617, filed Dec. 6, 2012, which application claims priority to German Patent Application No. 10 2011 120 498.2, filed Dec. 7, 2011, and to U.S. Provisional Patent Application No. 61/568,016, filed Dec. 7, 2011, which are each incorporated herein by reference in their entirety.

TECHNICAL FIELD

The technical field relates to a tool for producing a layer with a micro structured outer surface on a substrate surface.

BACKGROUND

Equipping surfaces with a micro structured coating for achieving various advantages, for example a reduction in sensitivity to soiling, a reduction in the flow resistance or some other effects, has been known. Notably, equipping surfaces of bodies exposed to flow with so-called riblets may result in a significant reduction in flow resistance or aerodynamic drag, which in particular in vehicles and other bodies exposed to flow, for example blades of wind turbines, results in improved efficiency.

Equipping a surface of a vehicle with a micro structure can be carried out by means of various application methods, such as adhesion methods and embossing methods. From DE 10 2006 004 644 B4 a tool for producing a layer with a micro structured outer surface on a substrate surface is known in which a negative of a micro structure to be produced is impressed on a web of an elastic matrix by means of a movable elastic pressure roller so that the material to be pressed on can be positioned between the substrate surface and the matrix and can, for example, be cured by means of a radiation source. The aforesaid patent specification discloses the use of a pressure roller and at least one deflection roller.

In addition, other objects, desirable features and characteristics will become apparent from the subsequent summary and detailed description, and the appended claims, taken in conjunction with the accompanying drawings and this background.

SUMMARY

Pressing a coating material, which is to be cured, onto a substrate surface by means of a roller that may be moved over the substrate surface can, in the treatment of larger surfaces, be associated with a number of disadvantages. A material to be applied by means of such a tool is easy to convey and dose so that during pressing the coating material onto the substrate surface it is consequently to be assumed that the coating material laterally oozes from the space between the substrate surface and the matrix, or drips from the edges of the matrix web, which edges are not in contact with the substrate surface. Furthermore, it is to be expected that, in particular, in larger substrate surfaces that are not completely planar in shape, lateral relative movement between the matrix and the pressure roller can occur, and consequently the micro structure may be imperfectly applied.

According to the various teachings of the present disclosure, a tool for producing a layer with a micro structured outer surface on a substrate surface is provided, which tool provides particularly high precision of the micro structured layer and at the same time prevents the danger of soiling or the discharge of excess coating material at the edges of a desired expansion of the micro structured layer.

The tool for producing a layer with a micro structured outer surface on a substrate surface comprises an elastic matrix web with a negative of the micro structure to be produced, an elastic pressure roller that is movable over a surface, and at least one guiding element for guiding the elastic matrix web relative to the pressure roller, wherein the pressure roller and the matrix web are arranged in such a manner that when the roller is moved over the substrate surface the negative on the matrix web faces the substrate surface.

The tool known from DE 10 2006 004 644 B4 is thus modified to the effect that during relative movements on the substrate surface the matrix web is prevented from carrying out a lateral movement relative to the pressure roller, which pressure roller presses the matrix web onto the substrate during the movement of the tool such that the coating material is applied to the substrate. The guiding element is generally designed in such a manner that a limited free movement cross section along the pressure roller is provided for the matrix web, through which cross section the matrix web can be moved. The dimensions of this movement cross section match the width of the matrix web so that the matrix web is unable to laterally break out of a predetermined movement. In particular when coating larger substrate surfaces that are not completely planar but instead are, for example, spatially curved, it may be ensured that the matrix web always exactly follows the movement of the pressure roller on the substrate surface, and thus the applied coating material follows the precise geometric specifications.

In one embodiment the guiding element is designed as guiding bodies on which the matrix web slides, which guiding bodies are arranged on frame elements that extend along an axis of rotation of the pressure roller on both sides of the tool. Such frame elements together with the guiding bodies form a rack that is rigidly affixed to the tool, for example a tool frame. The guiding bodies are provided to establish direct contact with the matrix web and to limit its ability to move laterally.

In one embodiment the tool comprises a delivery roller and a deflection roller which together with the pressure roller provide a closed movement path for the matrix web. In this arrangement the at least one guiding element may extend over several regions of the tool in order to guide the matrix web correspondingly relative to the pressure roller and in addition also to the delivery roller and the deflection roller. The delivery roller is provided for removing (lifting off) the matrix web from the at least partially-dried riblet application.

In one embodiment the delivery roller is arranged behind (downstream of) the pressure roller when viewed in the direction of movement of the matrix web. One section of the matrix web extends between the pressure roller and the delivery roller, thus contacting the substrate surface. In order to guide this section relative to the pressure roller and to the delivery roller the at least one guiding element is generally arranged so as to be spaced apart from the side of this section, which side faces the substrate surface, wherein the guiding element extends approximately laterally beside the pressure roller and the delivery roller, or wherein the guiding bodies extend into a region laterally of the pressure roller and of the delivery roller.

In one embodiment the guiding bodies are arranged on the frame elements with the use of retaining means, wherein the retaining means are designed to set a space between the frame elements and the guiding bodies. In this manner fine adjustment of the guiding device of the matrix web is achieved.

One embodiment comprises channel bodies with a drainage channel, which channel bodies at least in some regions extend to the edges of the matrix web. By means of the drainage channels excess coating material is collected that would otherwise run or drip from the edges of the matrix web to the substrate surface. In this manner any soiling of the substrate surface or of the micro structured coating is prevented. Generally, the coating material remains in the drainage channels or is discharged to an additional container that is connected to the drainage channels. Furthermore, the drainage channels can be connected to a container that is situated directly on the channel body.

One embodiment of the present disclosure comprises a metering device that is designed to set the layer thickness of the coating material applied to the matrix. The metering device is generally arranged directly downstream of a delivery roller or a device for applying a coating material.

In one embodiment the metering device is designed as a doctor blade or a metering scraper that is arranged at a selectable distance from the matrix web. Doctor blades are particularly effective means for homogeneously setting the layer thickness of a material on a movable web. In this arrangement a doctor blade can be made from various materials, for example metal or plastic, and may have various shapes, for example rounded, rectangular or square.

In one embodiment, on a side of the matrix web, which side is situated opposite the doctor blade, a press-on means is arranged that is designed to precisely guide the matrix web relative to the doctor blade so that the doctor blade may set a particularly precise layer thickness. The press-on means may be designed as a further guiding body whose width generally corresponds to the width of the matrix web. The press-on means may be coated with a material that comprises particularly good sliding characteristics so that the matrix web may easily slide over it. As far as the material is concerned, reference is made to the material of the guiding bodies.

The doctor blade and the press-on means may be spring mounted so that at all times adequate contact with the matrix web is provided, even if said matrix web moves when the tool is used.

In one embodiment the tool comprises an application device that applies the coating material onto the matrix web. In one example, the application device is arranged between the delivery roller and the deflection roller in order to provide the coating material with adequate time to achieve complete wetting of the matrix web.

In one embodiment the doctor blade is arranged directly downstream of the application device when viewed in the direction of movement of the matrix web in order to, immediately after the application, as soon as possible, remove any excess coating material from the matrix web, thus preventing any dripping.

In one embodiment a second doctor blade is arranged in the direction of movement between the deflection roller and the pressure roller so that any remaining excess coating material can be removed.

In one embodiment the tool comprises wipers that are connected to the channel bodies and that are positioned on the tool in such a manner that they touch the edges of the matrix web. The wipers may guide the coating material to the drainage channels that are arranged laterally on the matrix web. In this way it is possible to remove even smaller excess quantities of the coating material, which while wetting the outside edges of the matrix web would not by themselves drain by forming droplets.

In one embodiment the channel bodies are arranged on the guiding bodies in such a manner that the guiding bodies themselves are the wipers. Consequently, the tool is of a more compact and simpler design.

In one embodiment the deflection roller comprises a guiding groove whose width matches the width of the elastic matrix web. By means of this guiding groove, guiding of the matrix web can already be achieved by the deflection roller so that together with the guiding bodies or other suitable guiding elements very precise guiding of the matrix web is achieved.

One embodiment of the tool comprises a tool frame on which at least one first snap-lock element is arranged that corresponds to at least one second snap-lock element on a frame element in such a manner that the frame element can be attached to the tool by way of an undoable snap-lock connection. In this arrangement the guiding element may be affixed from the outside or from the inside, by means of a snap-lock connection, to the tool frame. In the necessary exchange of a matrix web this makes it possible to remove the guiding element quickly and in an uncomplicated manner in order to improve the operational readiness of the tool.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF TUE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
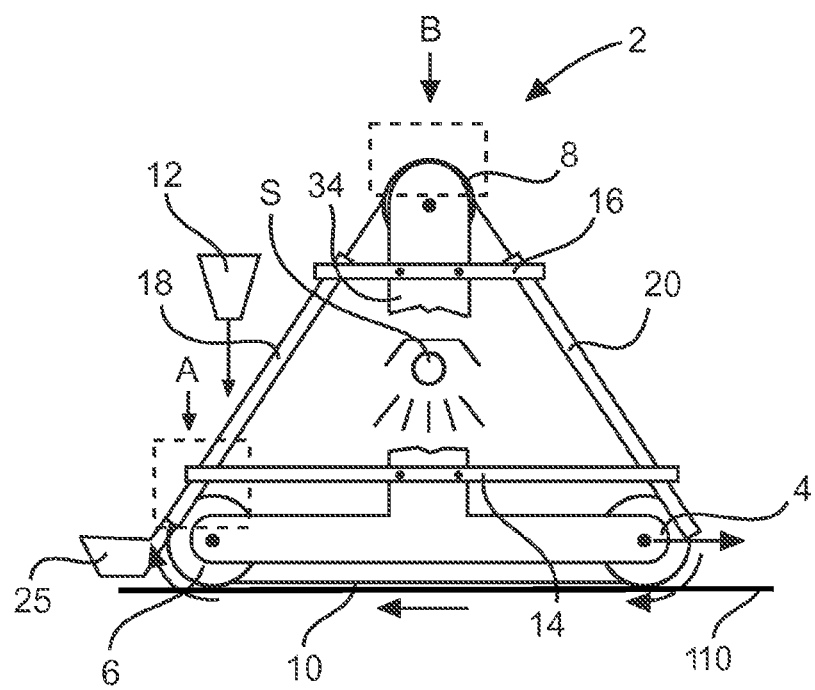
FIG. 1 shows a schematic lateral view of a tool.

FIG. 1 shows a schematic lateral view of a tool 2. The tool 2 comprises a pressure roller 4, a delivery roller 6 and a deflection roller 8 which guide a movable elastic matrix web 10 on a closed circuit. The matrix web 10 extends around all three rollers 4, 6 and 8 and can be moved in the manner of a belt by rolling off the individual rollers. A tool frame 34, which as an example, but not necessarily, comprises the shape of an inverted T, is designed to rotatably hold the rollers 4-8, to retain further components, and to the tool 2 by a robot arm or some other movement means. It is advantageous if the tool frame 34 at the top allows rotatable holding, on a vertical axis, on a movement means, so that during an application process a change in the direction of movement is made possible while the tool 2 in this process is only subjected to an unchanging direction of movement of the matrix web 10.

The tool 2 is moved in the direction of the arrow on a substrate surface 110. Consequently, the matrix web 10 moves clockwise, thus in a rolling movement of the pressure roller 4 reaches the substrate surface 110 between the pressure roller 4 and the substrate surface 110. A coating material, which adheres to the negative side of the matrix web 10, which coating material completely wets the matrix web 10, ends up between the matrix web 10 and the substrate surface 110 and in this process is delivered to the substrate surface 110.

The negative side of the matrix web 10 is on a side of the matrix web 10, which side faces away from the rollers 4, 6 and 8. The coating material that is to be delivered onto the substrate surface can be applied to the matrix web 10 in a region between the delivery roller 6 and the deflection roller 8 and, as an alternative or in addition, also between the deflection roller 8 and the pressure roller 4. This may take place, for example, by means of an application device 12 in the form of a delivery nozzle or some other suitable devices. A desired layer thickness may be set by way of a metering scraper that is generally located between the delivery roller 6 and the deflection roller 8 in the direction of movement of the matrix web immediately downstream of the application device 12 as is shown in more detail in FIG. 4.

In a region between the pressure roller 4 and the delivery roller 6 at least partial curing of the coating material may take place, for example by irradiation using a radiation source S that is situated in the interior of the tool 2. For this purpose the matrix web 10 may be designed so as to be at least partly translucent so that the radiation emitted by the radiation source can reach the coating material.

Since the coating material may usually be a liquid or at least paste-like coating material that is openly applied to the negative side of the matrix web 10 there is a danger of the coating material failing to remain on the matrix web 10 but instead of laterally flowing or dripping from the edges of the matrix web 10, thus causing uncontrolled delivery on the substrate surface. Furthermore, during a traverse movement of the tool 2 on the substrate surface as a result of the contact force of the pressure roller 4 and of the traverse movement of the tool 2 it is quite possible for the matrix web 10 to laterally slide or drift on the rollers 4, 6 and 8. Such drift results in imprecise delivery of the coating material, which especially in the case of a micro structure is totally undesirable.

Figure 5:
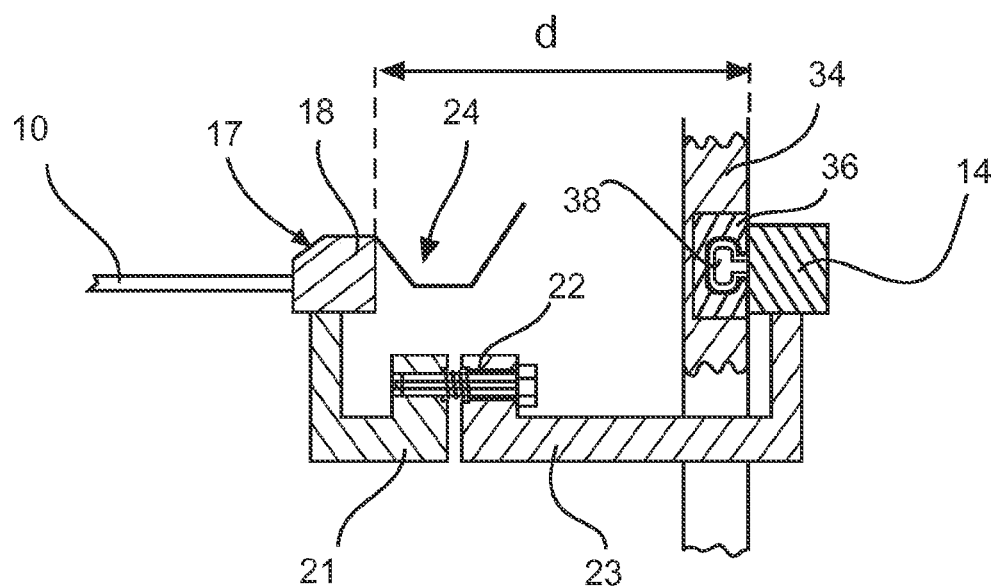
FIG. 5 shows a partial section view of the tool of FIG. 2.

For this reason the tool 2 according to the present disclosure on both sides generally comprises a guiding frame that comprises, for example, a first frame element 14, a second frame element 16, and two guiding bodies 18 and 20 that are arranged so as to be immovable relative to the axes of rotation of the rollers 4, 6 and 8. For example, the two frame elements 14 and 16 extend parallel to a sector formed between the pressure roller 4 and the delivery roller 6. Such a guiding frame may be present separately of the tool flame 34, or in an alternative embodiment may also carry out the actual function of the tool frame 34 for retaining the rollers 4, 6 and 8. However, the frame elements 14 and 16 are generally connectable to the tool frame 34 by way of one or several undoable snap-lock connections or clip connections so that exchanging the matrix web 10 does not require expensive deinstallation work of the guiding bodies 18 and 20. FIG. 5 shows an example of such a snap-lock connection The guiding bodies 18 and 20 are designed to prevent lateral movement of the matrix web 10 and thus drift on the rollers, and in particular of the pressure roller 4. For this reason it is necessary for said guiding bodies 18 and 20 to comprise a coating with good sliding characteristics, with a layer of polytetrafluoroethylene (also known as "Teflon") being particularly suitable for this. The actual material of these guiding bodies 18 and 20 may correspond to a material usually selected in the context of a tool that is not restricted in weight. The frame elements 14 and 16 may, for example, be made from steel, with only the guiding bodies 18 and 20 comprising a corresponding coating.

Figure 2:
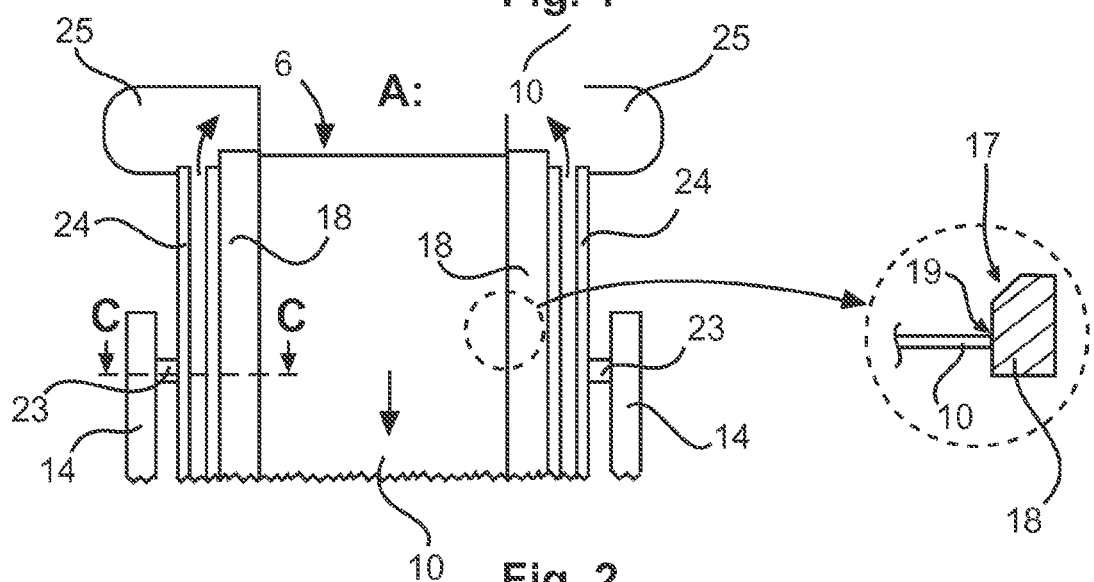
FIG. 2 shows a detail of a rear view of the tool.

FIG. 2 shows the top view, designated "A" in FIG. 1, of a detail above the delivery roller 6. The guiding bodies 18 of two sides beside the matrix web 10 are shown, which guiding bodies 18 match the width of the matrix web 10. Further on, in FIG. 5, fine adjustment of the lateral position of the guiding bodies 18 is shown, in the example of the guiding bodies 18 and 20, at the section line C-C. Fine adjustment makes it possible to compensate for manufacturing tolerances in the production of a matrix web 10 or of the tool 2 per se. Generally, a distance of about 10 μm to about 1 cm is to be maintained between the guiding bodies 18 or 20 and the adjoining edge of the matrix web 10. This may take place in that by adjusting a retaining means 22 the distance designated "d" between the guiding body 18 and the frame element 14 is varied.

It is further shown that in order to receive excess coating material, a drainage channel, formed somewhat above the delivery roller 6, is arranged on both sides, which drainage channel is formed by a channel body 24, wherein the channel body 24 can be designed as a metal sheet with a number of edges to form a channel shape or as a plastic component for receiving the coating material. Integration of a channel body 24 largely prevents soiling of the substrate surface by preventing dripping from edges of the matrix web 10. In the illustration shown each of the guiding bodies 18 arranged between the deliver roller 6 and the deflection roller 8 is connected to a channel body 24. However, the channel bodies 24 may also be implemented as components that are separate and located away from the guiding bodies 18. Furthermore, it is imaginable for the side between the deflection roller 8 and the pressure roller 4 to comprise channel bodies 24.

For example, each of the channel bodies 24 comprises a laterally and longitudinally extending trough-shaped or cup-shaped receptacle 25 in which excess coating material can collect. By removing the channel bodies 24 the respective receptacle 25 can be emptied.

In order to support receiving excess coating material the guiding bodies 18 are beveled, wherein the resulting bevel 17, shown in FIG. 2 and FIG. 5, largely extends from the matrix web 10 to the respective adjacent channel body 24. In a connection region between the matrix web 10 and the guiding body 18 a step 19 of a height of about 5 μm to about 1 cm relative to the matrix web can be formed, with the height of said step in one example, ranging from about 10 μm to about 100 μm.

Figure 3:
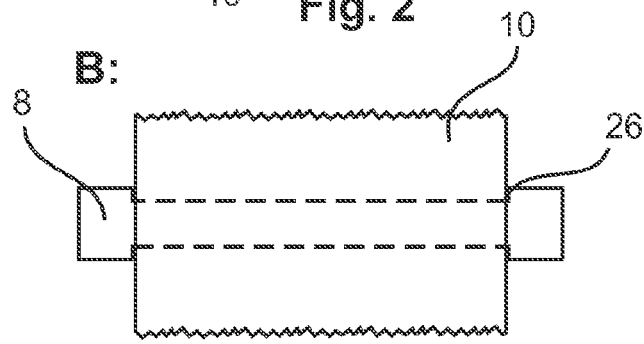
FIG. 3 shows a detail of a top view of the tool.

The lateral view, shown in FIG. 3, of an upper part of the tool 2 with a deflection roller 8 illustrates that the deflection roller 8 can comprise a guiding groove 26 whose width corresponds to the width of the matrix web 10. The combination of this guiding groove 26 and the guiding bodies 18 and 20 may thus result in particularly advantageous and precise guiding of the matrix web 10. The depth of the guiding groove should range from about 10 µm to about 1 cm, and in one example, range from about 10% to about 200% of the thickness of the matrix web 10. The width of the groove should generally exceed the width of the matrix web by about 500 µm to about 1 mm so as not to impede the movement between the deflection roller 8 and the matrix web 10; however, it should be designed to be as narrow as possible because otherwise the matrix would carry out excessive lateral movement. The guiding groove 26 in the deflection roller 8 thus represents a movable guiding element.

Figure 4:
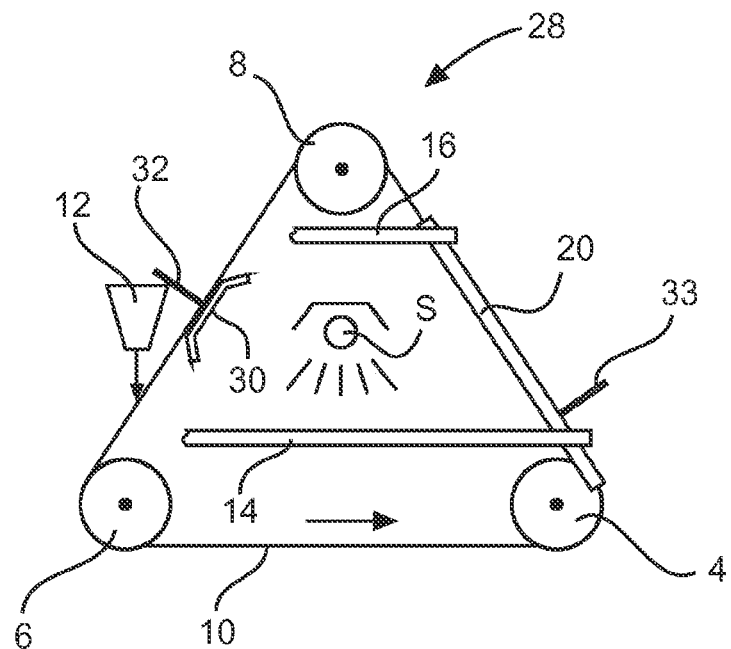
FIG. 4 shows a schematic lateral view of a modified design of a tool.

FIG. 4 shows a simplified lateral illustration of a tool 28 that in addition to the tool 2 from FIG. 1 also comprises two metering scrapers 32 and 33 and a press-on means 30 arranged on a side of the matrix web, which side is opposite the metering scraper 32. In is manner it is possible to achieve precise metering of the coating material by precisely guiding the matrix web 10 behind the metering scraper 32, which results in a precisely set layer thickness.

FIG. 5 shows a section on the section line designated C-C in FIG. 2, an exemplary arrangement of the channel body 24, with a guiding body 18, two retaining means elements 21 and 23, of a tool frame 34 and of a frame element 14. On the tool frame 34 a first snap-lock element 36 is arranged that is designed so as to correspond to a second snap-lock element 38 on the frame element 14 so that these elements can enter a snap-lock or clip connection. The embodiment shown is not to be interpreted as limiting in any way; instead, all imaginable snap-lock elements can be used that can establish a snap-lock connection between the tool frame 34 and a frame element 14. By means of a snap-lock connection the frame elements 14 and 16 and thus the guiding bodies 18 and 20 can very easily be affixed to the tool 2 or 28 and in turn removed therefrom.

For the purpose of fine-adjustment of the space, designated "d", of a mounting device of the guiding body 18 on the frame element 14 with the use of the two retaining means elements 21 and 23 a securing means 22 arranged on both retaining means elements 21 and 23 can be used, which securing means 22 makes a settable variable extension of the resulting retaining means possible. The securing means 22 can for example, be a bolt or a screw which is screwed into at least one of the two retaining means elements 21, 23 and which can vary the space between the aforesaid relative to each other. A coil spring or some similar element could be arranged between the two retaining means elements 21, 23, which coil spring or similar element ensures continuous spacing apart. In this manner variable-position mounting of the guiding body 18 on the frame element 14 can take place. Mounting all the other guiding bodies or frame elements takes place correspondingly.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A tool for producing a coating layer with a micro structured outer surface on a substrate surface, comprising:
    an elastic matrix web with a negative of a micro structure to be produced,
    an elastic pressure roller that is movable over the substrate surface,
    a deflection roller,
    a delivery roller, wherein the delivery roller and the deflection roller together with the elastic pressure roller provide a closed movement path for the elastic matrix web,
    a frame configured to guide the elastic matrix web relative to the pressure roller,
    an application device for applying a coating material onto the matrix web, and
    channel bodies with a drainage channel, wherein the channel bodies extend to edges of the matrix web in at least some regions;
    wherein the pressure roller and the matrix web are arranged in such a manner that when the pressure roller is moved over the substrate surface the negative on the matrix web faces the substrate surface to thereby produce the coating layer from the coating material with the micro structured outer surface on the substrate surface.

2. The tool of claim 1,
    wherein the frame comprises a plurality of guiding bodies on which the matrix web slides, which guiding bodies are arranged on frame elements that extend along an axis of rotation of the pressure roller on both sides of the tool.

3. The tool of claim 2,
    wherein the guiding bodies are arranged on the frame elements with the use of retaining means, and
    wherein the retaining means are designed to set a space between the frame elements and the guiding bodies.

4. The tool of claim 1,
    wherein the delivery roller is arranged behind the pressure roller when viewed in the direction of movement of the matrix web.

5. The tool of claim 1, wherein the channel bodies are arranged on guiding bodies, that guide coating material to the drainage channel.

6. The tool of claim 1, wherein the deflection roller comprises a guiding groove whose width matches the width of the elastic matrix web.

7. The tool of claim 1, further comprising a tool frame on which at least one first snap-lock element is arranged that corresponds to at least one second snap-lock element on the frame in such a manner that the frame is attachable to the tool by way of an undoable snap-lock connection.

8. The tool of claim 1, further comprising a metering device for setting the layer thickness of the coating material on the matrix web.

9. The tool of claim 8, wherein the metering device is a metering scraper.

10. The tool of claim 9, further comprising a press-on means arranged on a side of the matrix web, which side is situated opposite the metering scraper, and the press-on means is designed to precisely guide the matrix web relative to the metering device.

11. A tool for producing a coating layer with a micro structured outer surface on a substrate surface, comprising:
    an elastic matrix web with a negative of a micro structure to be produced, an elastic pressure roller that is movable over the substrate surface, a deflection roller, a delivery roller, the delivery roller and the deflection roller together with the pressure roller provide a closed movement path for the matrix web, a frame configured to guide the elastic matrix web relative to the pressure roller, an application device for applying a coating material onto the matrix web, and channel bodies with a drainage channel, which channel bodies at least in some regions extend to edges of the matrix web, wherein the pressure roller and the matrix web are arranged in such a manner that when the pressure roller is moved over the substrate surface the negative on the matrix web faces the substrate surface to thereby produce the coating layer from the coating material with the micro structured outer surface on the substrate surface.

12. The tool of claim 11, wherein the delivery roller is arranged behind the pressure roller when viewed in the direction of movement of the matrix web.

13. The tool of claim 11, wherein the channel bodies are positioned as wipers on the tool in such a manner that they touch the edges of the matrix web.

14. The tool of claim 11, wherein the channel bodies are arranged on guiding bodies that guide coating material to the drainage channel.

15. The tool of claim 11, wherein the deflection roller comprises a guiding groove having a width that matches the width of the elastic matrix web.

16. The tool of claim 11, further comprising a metering device for setting the layer thickness of the coating material on the matrix web.

* * * * *